Aug. 12, 1924.
B. L. SPITZER
1,504,989
STEREORADIOSCOPE
Filed April 8, 1921
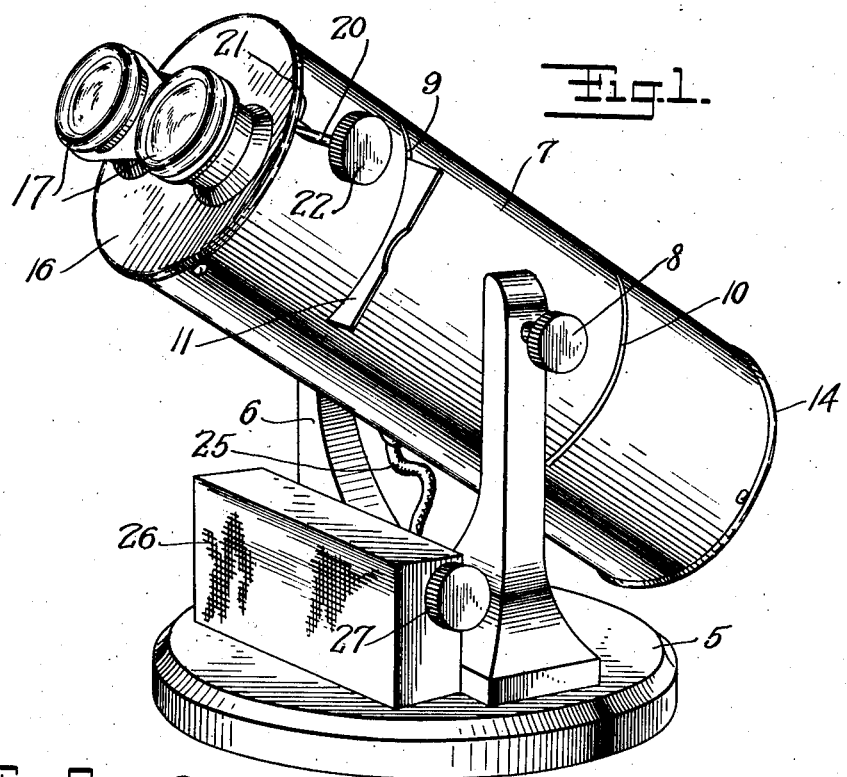
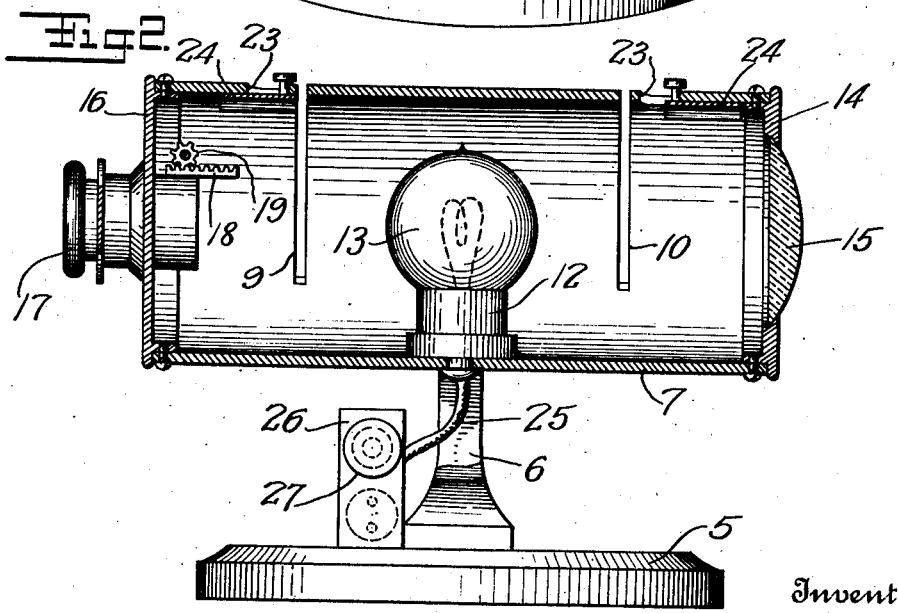
Inventor
Benjamin L. Spitzer
By his Attorney Patented Aug. 12, 1924.

1,504,989

UNITED STATES PATENT OFFICE.

BENJAMIN L. SPITZER, OF NEW YORK, N. Y.

STEREORADIOSCOPE.

Application filed April 8, 1921. Serial No. 459,778.

*To all whom it may concern:*

Be it known that I, BENJAMIN L. SPITZER, a citizen of the United States, and resident of the borough of Manhattan, city, county, and State of New York, have invented certain new and useful Improvements in Stereoradioscopes.

This invention relates to improvements in devices for viewing and examining negatives and its principal object is to provide a device by which dental X-ray negatives commonly known as radiographs, may be examined.

Another object of the invention is to provide a device wherein it is possible to give negatives depth by the utilization of the stereoradioscope principle and I so construct my instrument that one end may be utilized to view a single negative while the other end is provided with a binocular for examining a pair of negatives. The pair of negatives may be from the same film pack that is, a pair of negatives taken on one exposure or may be preferably two negatives radiographed stereoscopically that is, the exposures being made at an angle to each other, the preferred differences being approximately a 2½ inch shift of the position of the X-ray tube.

Beside producing considerable magnification the binocular stereoscopic method of examining dental radiographs brings out to an appreciable degree the three dimensions in the negative.

Another object of the present invention resides in the provision of a radiograph examining apparatus which is provided with explanation windows so that the party utilizing the apparatus may readily explain to his patient the conditions as shown by the X-ray negative.

Still another object of the invention resides in the provision of a means for varying the brilliance of the illuminating means so that negatives of varying density may be viewed equally well by the proper adjustment of the regulator.

A further object of the invention is to provide a device in which films and mounts of varying sizes may be readily viewed.

With these and other objects in view the invention consists of a novel construction, combination and arrangement of parts which will be fully set forth in the following specification, claimed and illustrated in the accompanying drawings in which:—

Fig. 1, is a perspective view of this improved radioscope.

Fig. 2, is a longitudinal sectional view through Fig. 1.

Referring to the drawings in detail the numeral 5 designates the base of the device provided with a yoke 6 in which the barrel or cylinder 7 is mounted on suitable screws 8 which may be tightened or loosened to permit of ready adjustment of the cylinder. Formed between the center and opposite ends of the barrel are the slots 9 and 10 which extend transversely through the barrel and provide the receiving guides for the negatives and mounts indicated at 11.

Arranged centrally within the barrel is a lamp socket 12 for the reception of a suitable lamp bulb 13 and one end of the barrel is closed by a cap 14 provided with a centrally disposed opening to receive the magnifying lens 15. The opposite end of the barrel is closed by a cap 16 carrying the adjustable binocular or stereoscopic lenses 17 which may be moved inwardly or outwardly by means of the rack and pinion 18 and 19, it being understood that the pinion is secured to the inner end of a shaft 20, the outer end of which projects through a relatively short longitudinal slot 21 formed in the barrel 7 adjacent the end closed by the cap 16. The extreme outer end of the shaft 20 is provided with a thumb piece 22 by which it may be easily operated to adjust the binocular.

In order to provide a means for admitting a pointer to the interior of the device and to enable the user to indicate various parts or conditions of the objects shown on the radiograph, an explanation window 23 is arranged adjacent each of the slots 9 and 10 and each of said windows is provided with a sliding cover 24 by which it may be closed.

The lamp socket 12 is connected by means of a flexible cable 25 to a rheostat 26 provided with a thumb piece 27 by means of which the current passing through the lamp may be regulated.

In operation the user places a single negative in the slot 10 or a pair of stereoscopic negatives in the slot 9 depending upon which end of the device he desires to use and the lamp 13 is then lighted and upon turning the thumb piece 27 the light may be dimmed for a thin negative or made more brilliant for a dense negative so as to show the negatives at their highest efficiency.

The user may then by inserting a pointer through through the explanation window point out to his patient the various conditions as shown upon the negative, obviously the strong light behind the negative will overcome any light which may be admitted through the explanation window so that a clear showing at all times may be had.

While in the foregoing there has been shown and described a preferred embodiment of this invention, it is to be understood that certain changes in the details of construction may be resorted to without departing from the spirit and scope of the invention.

What is claimed is:—

1. An instrument of the character described comprising a tube having negative receiving slots near opposite ends, illuminating means arranged in the tube between the slots and in line with the negative and magnifying means at opposite ends of the tube through which negatives placed in the slots may be viewed, one of said magnifying means being stereoscopic.

2. An instrument of the character described comprising an adjustable tube, illuminating means mounted intermediate the ends of the tube and approximately upon the longitudinal axis thereof, said tube having negative receiving slots on opposite sides of the illuminating means and apertures adjacent said slots, means for closing said apertures, means at opposite ends of the tube through which negatives placed in the slots may be viewed and means for varying the intensity of the illuminating means to properly bring up the image on the negative.

3. A radioscope comprising an adjustable tube, illuminating means interior of and intermediate its ends, said tube having a negative receiving slot near one end and magnifying means in the end adjacent the slot through which a negative placed in the slot may be viewed, an extension at the opposite end of the tube having a negative receiving slot therein, and a pair of stereoscopic eye pieces adjustably mounted at the end of the extension whereby negatives placed in the last named slot may be viewed and depth lent to the image thereon, and means to vary the intensity of the illuminating means.

Signed in the city, county and State of New York, this day of Jan. 31, 1921.

BENJAMIN L. SPITZER.